Figure 1:
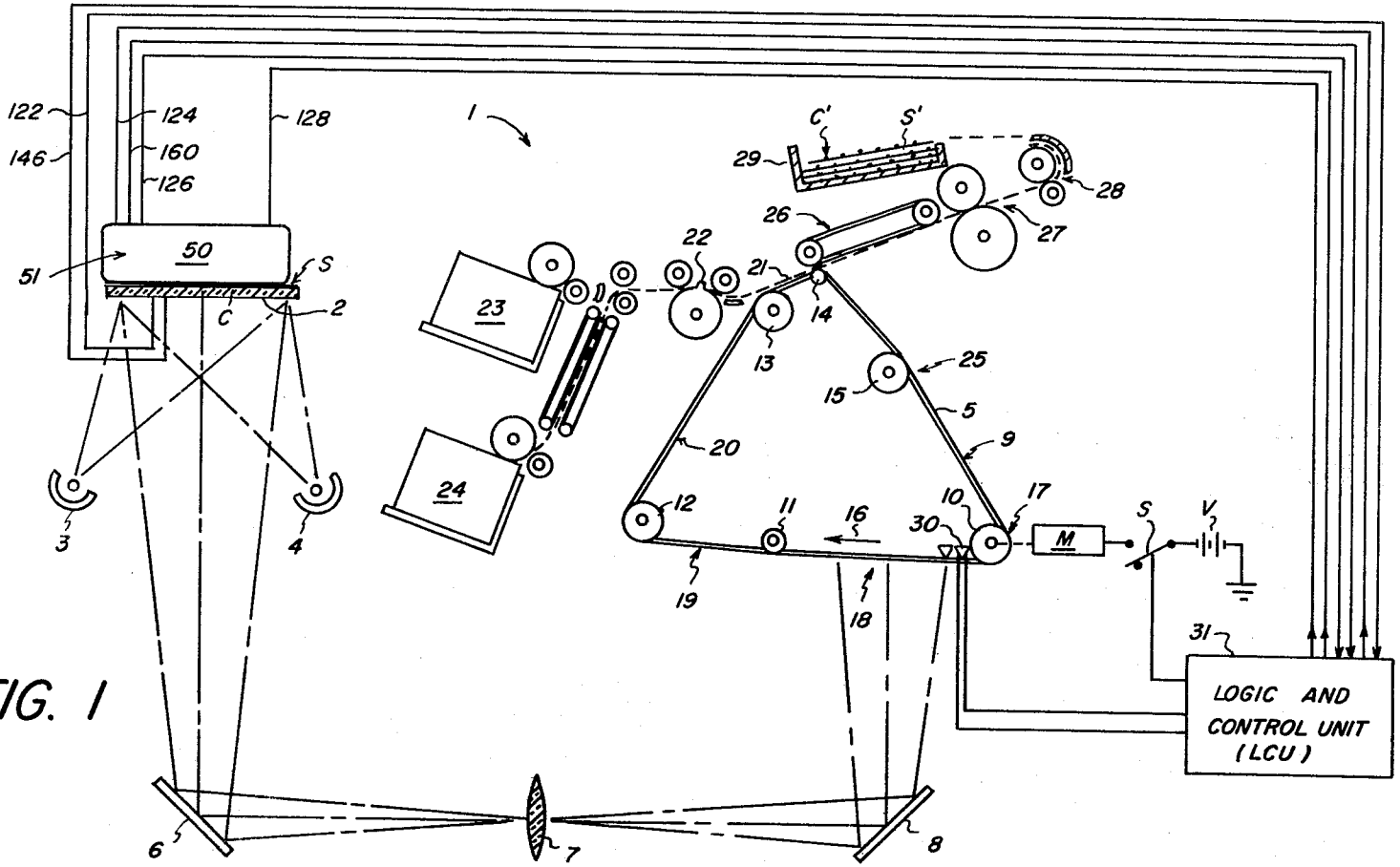
Figure 2:
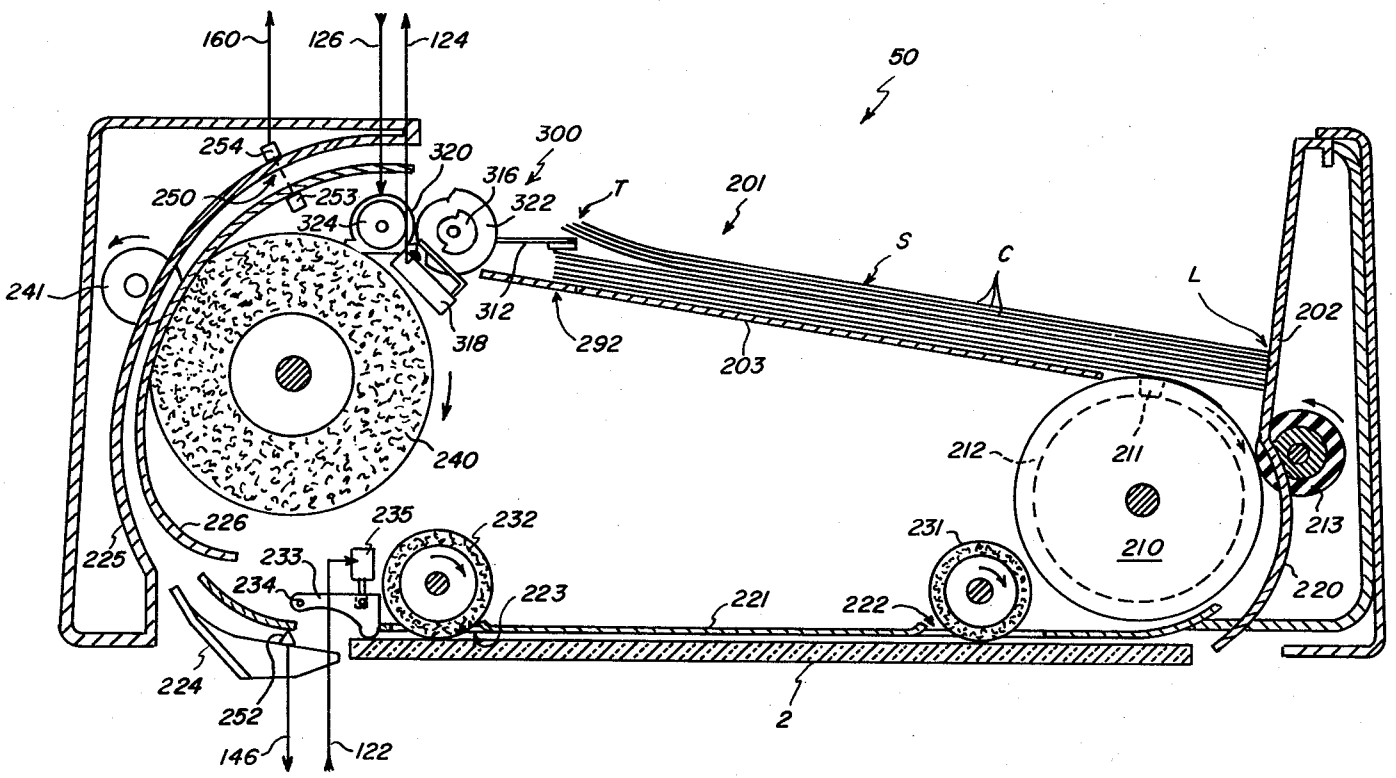

United States Defensive Publication [19] (H) [11] T103,301

Smith, Jr. [43] Aug. 2, 1983

[54] CONTROL APPARATUS FOR SEPARATOR MEMBER USED IN RECIRCULATING FEEDERS

[76] Inventor: Robert C. Smith, Jr., 901 Elmgrove Rd., Rochester, N.Y. 14650

[21] Appl. No.: 315,765

[22] Filed: Oct. 28, 1981

[51] Int. Cl.[3] ..... B65H 1/06; B65H 1/26

[52] U.S. Cl. ..... 271/3.1; 271/4

[57] ABSTRACT

A recirculating feeder for a copier employs a separator member that initially engages the top sheet of a multi-sheet document in a tray and incrementally moves downwardly under the influence of gravity as individual sheets are fed from the bottom of the document to the copier exposure platen and returned to the top of the document in the tray. The separator member is mounted on a shaft that carries a cam which is adapted to open and close a switch. When the sheet initially engaged by the separator member is fed, the separator member falls below the tray. At this position, the cam closes the switch which energizes a motor. The energized motor drives a roller which engages the surface of a contoured roller connected to the shaft. The separator member is thereby driven towards return engagement with the top document sheet. Prior to the separator member returning to such engagement, the surface of the contoured roller disengages from the drive roller. At this position, the cam opens the switch and de-energizes the motor. However, even if the switch should stick and remain energized, since the drive roller does not engage the contoured roller, the separator member will fall onto the top document sheet without damaging it.

1 Claim, 3 Sheets Drawing,

15 Pages Specification

The file of this unexamined application may be inspected and copies thereof may be purchased (849 O.G. 1221, Apr. 9, 1968).

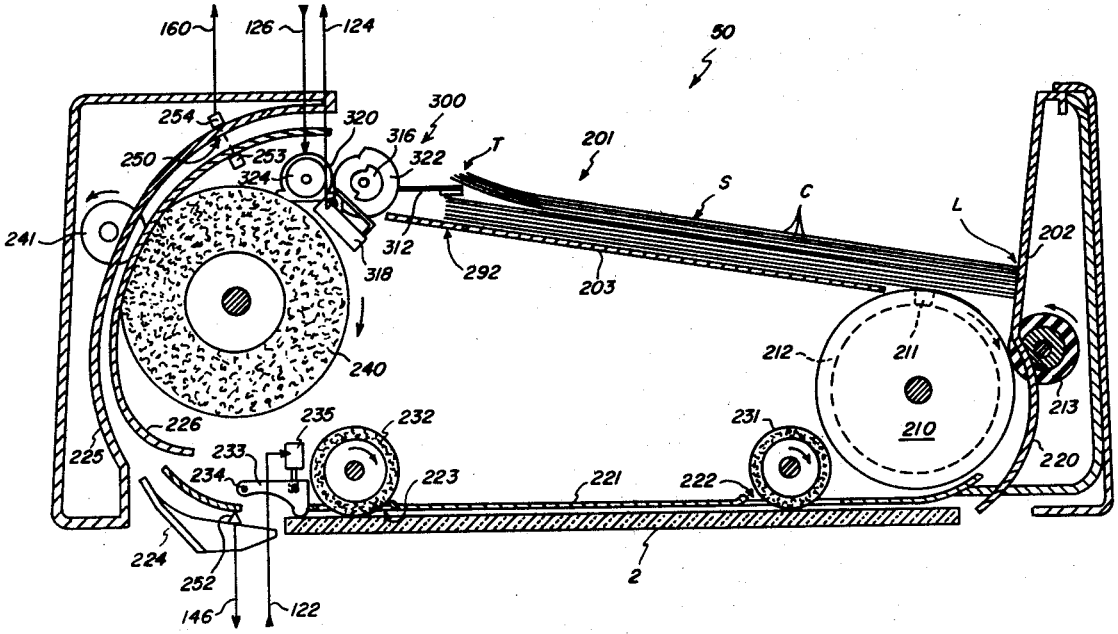

FIG. 3
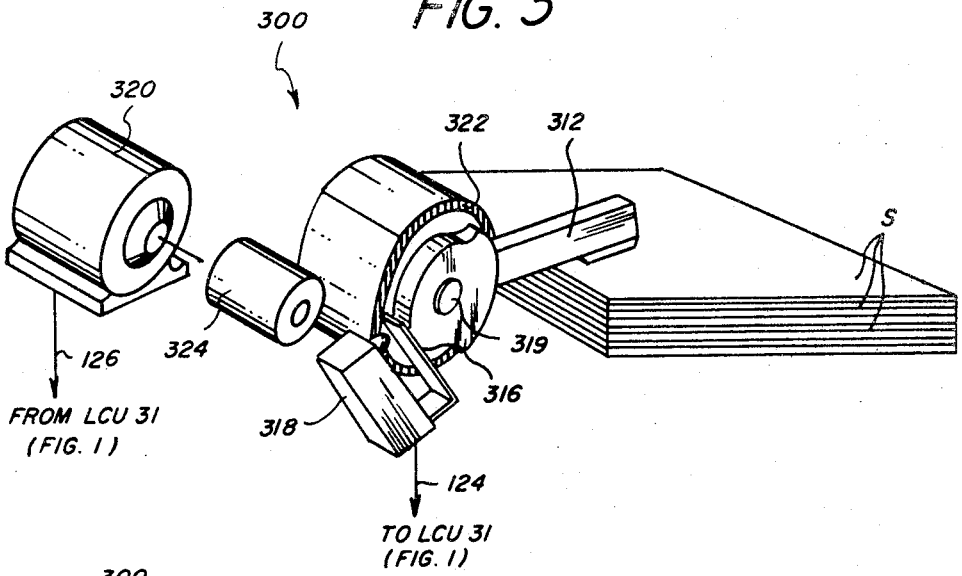
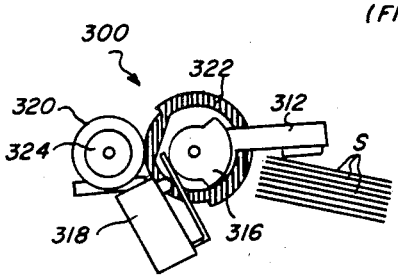
FIG. 4a
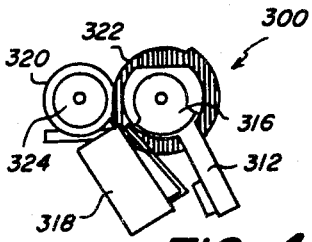
FIG. 4b
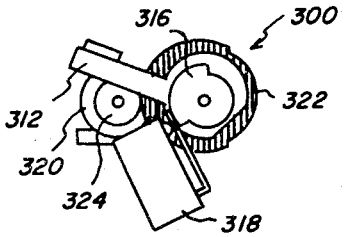
FIG. 4c
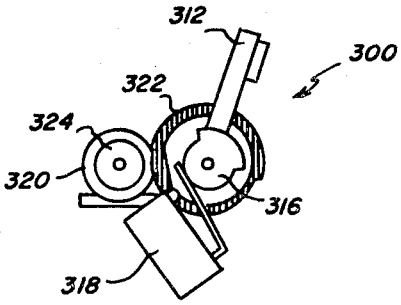
FIG. 4d